United States Patent
Loaec et al.

(10) Patent No.: US 10,721,655 B2
(45) Date of Patent: Jul. 21, 2020

(54) METHOD OF PROCESSING EMERGENCY CALL TRANSFER REQUESTS

(71) Applicant: Orange, Paris (FR)

(72) Inventors: Guy Loaec, Ploudaniel (FR); José Doree, Lannion (FR); Jean-Claude Le Rouzic, Trebeurden (FR)

(73) Assignee: ORANGE, Paris (FR)

( * ) Notice: Subject to any disclaimer, the term of this patent is extended or adjusted under 35 U.S.C. 154(b) by 97 days.

(21) Appl. No.: 15/764,846

(22) PCT Filed: Sep. 23, 2016

(86) PCT No.: PCT/FR2016/052412
§ 371 (c)(1),
(2) Date: Mar. 29, 2018

(87) PCT Pub. No.: WO2017/055714
PCT Pub. Date: Apr. 6, 2017

(65) Prior Publication Data
US 2018/0288656 A1    Oct. 4, 2018

(30) Foreign Application Priority Data
Sep. 30, 2015  (FR) ..................... 15 59234

(51) Int. Cl.
*H04W 36/00*  (2009.01)
*H04W 4/90*  (2018.01)
*H04W 36/22*  (2009.01)

(52) U.S. Cl.
CPC ......... *H04W 36/0022* (2013.01); *H04W 4/90* (2018.02); *H04W 36/22* (2013.01)

(58) Field of Classification Search
CPC .... H04W 36/0022; H04W 4/90; H04W 36/22
See application file for complete search history.

(56) References Cited

U.S. PATENT DOCUMENTS

2014/0370842 A1* 12/2014 Abtin ..................... H04W 4/90
455/404.2
2014/0376514 A1  12/2014 Wong et al.
2015/0024703 A1* 1/2015 Lindholm ............... H04W 4/90
455/404.1

FOREIGN PATENT DOCUMENTS

EP         2852119         3/2015

OTHER PUBLICATIONS

International Search Report and Written Opinion dated Jan. 10, 2017 for Application No. PCT/FR2016/052412.
(Continued)

*Primary Examiner* — Jackie Zuniga Abad
(74) *Attorney, Agent, or Firm* — Knobbe, Martens, Olson & Bear, LLP (57) ABSTRACT

A method is disclosed of processing emergency call transfer requests by an entry server of an IMS core network. The method includes configuring a table associating at least one emergency call session transfer number with a plurality of emergency call session transfer nodes, each node being identified in the table by an address. Upon receiving a request to transfer an emergency call session from a first access network to a second access network, the request including an emergency call session transfer number, the table is used to determine at least one address of a transfer node associated with the transfer number contained in the request to transfer the request. The transfer request is then sent to the at least one determined address.

11 Claims, 2 Drawing Sheets

(56) References Cited

OTHER PUBLICATIONS

3GPP TS 24.229 entitled "IP multimedia call control protocol based on session initiation protocol (SIP) and session description protocol (SDP); Stage 3", v13.2.1, Jun. 2015.

3GPP TS 24.237 entitled "IP multimedia (IM) core network (CN) subsystem IP multimedia subsystem (IMS) service continuity; Stage 3", v.13.1.0, Jun. 2015.

\* cited by examiner

FIG.1

FIG.2

METHOD OF PROCESSING EMERGENCY CALL TRANSFER REQUESTS

RELATED APPLICATIONS

This application is the U.S. National Phase of Application No. PCT/FR2016/052412 entitled "METHOD FOR PROCESSING REQUESTS TO TRANSFER EMERGENCY CALLS" filed Sep. 23, 2016, which designated the United States, and which claims the benefit of French Application No. 1559234 filed Sep. 30, 2015.

BACKGROUND OF THE INVENTION

The invention relates to the general field of telecommunications.

It relates more particularly to processing emergency calls in a voice over Internet protocol (IP) multimedia subsystem (IMS) core network as defined by the third group partnership project (3GPP) standard, and in particular it relates to transferring an emergency call initiated from a first access network to a second access network. Thus, the invention applies in preferred but non-limiting manner to transferring an emergency call initiated in a packet switched (PS) mobile access network such as a $4^{th}$ generation (4G) network or a long-term evolution (LTE) network that relies on an IMS core network architecture, to a circuit switched (CS) access network of the $2^{nd}$ generation (2G) or the $3^{rd}$ generation (3G) (for voice communications) such as a global system for mobile communications (GSM) network, a universal mobile telecommunications system (UMTS) network, etc.

In voice-over-IP (VoIP) IMS core networks, there exists a procedure referred to as single radio voice call continuity (SRVCC) that makes it possible, in the event of losing coverage of the 4G access network, to handover (transfer) a call (and in particular an emergency call) from the IMS core network to the conventional 2G/3G CS network.

More precisely, an emergency call initiated by a mobile terminal on an LTE 4G access network is processed by an emergency call session control function (E-CSCF) server. While setting up the emergency call session, the E-CSCF server selects an emergency access transfer function (EATF) node or instance in order to anchor the signaling, i.e. in order to force the signaling concerning the emergency call to pass via that EATF node. The EATF node is thus suitable in particular, where appropriate, for processing requests to transfer the emergency call to an access network other than the 4G access network on which the call was initiated, and in particular to a 2G/3G circuit switched access network, in order to ensure continuity for the emergency call while it is being transferred from a first access network to a second access network. This procedure, and also the functions of the EATF node are described in particular in the following specification documents: 3GPP TS 24.229 entitled "IP multimedia call control protocol based on session initiation protocol (SIP) and session description protocol (SDP); Stage 3", v13.2.1, June 2015; and 3GPP TS 24.237 entitled "IP multimedia (IM) core network (CN) subsystem IP multimedia subsystem (IMS) service continuity; Stage 3", v.13.1.0, June 2015.

In the present state of the 3GPP standard, in the event of the mobile terminal losing coverage from the 4G access network on which the emergency call was initiated, a request for transferring the call to the 2G/3G CS network is sent by the 4G access network to the mobile switching center (MSC) device of the 2G/3G network that covers the 2G and/or 3G cells in which the mobile terminal is located. In known manner, the MSC device is in charge of processing calls sent and received over 2G/3G networks (including emergency calls) and of interconnecting 2G/3G networks with other telecommunications networks (including the 4G network on which the emergency call was initiated). The MSC device then transfers the transfer order to the IMS core network, and more particularly to the interrogating-CSCF (I-CSCF) server of the IMS core network, which is the point of entry to the IMS core network, in the form of a session initiation protocol (SIP) INVITE request sent to a predefined emergency call transfer identifier or number also referred to as an emergency session transfer number single radio (E-STN-SR) number. The E-STN-SR number may be configured as a public service identity (PSI) and it may be stored in the home subscriber server (HSS). The I-CSCF server can then interrogate the HSS using the E-STN-SR number to obtain an address of the EATF node in which the signaling of the emergency call that is to be transferred is anchored.

For a given IMS core network, the standard presently provides for a single E-STN-SR number configured on all of the MSC devices that interconnect with the IMS core network, and a single EATF instance associated with that single E-STN-SR number to which the I-CSCF server sends the SIP INVITE request received from the MSC device. As a result, loss of the site hosting the single EATF instance (e.g. for reasons of congestion or loading) leads to the total loss of the emergency call transfer function in the IMS core network, which is particularly damaging.

In order to avoid such a situation, it is possible to envisage deploying a plurality of EATF instances in a single IMS core network. Managing a plurality of EATF instances also makes it easier to authorize configurations in which a plurality of regions or countries are covered by a single IMS core network, but in which dedicated E-CSCF/EATF instances are allocated per region or per country, since the translation of emergency numbers is always specific to the country/region of deployment.

Nevertheless, this situation in which a plurality of EATF instances are deployed in a single IMS core network is not presently envisaged in the standard. Unfortunately, in order to transfer the emergency call successfully, such a situation makes it necessary to ensure that the EATF instance selected by the I-CSCF server coincides with the EATF instance selected by the E-CSF server for anchoring the emergency call session that is to be transferred.

Document WO 2013/075746 proposes a solution for redirecting an emergency call transfer request step by step among a plurality of EATF instances of the IMS core network, making it possible to manage situations in which the EATF instance that receives the transfer request is not the instance in which the call session for transferring is anchored. Nevertheless, it should be observed that that solution does not work when the first EATF instance as selected by the I-CSCF server and to which the transfer request is transferred is itself not accessible, e.g. as a result of failure or congestion of the site hosting that instance. Furthermore, the transfer request following a path among the various EATF instances or being redirected to another EATF instance gives rise to a transfer delay that, under certain circumstances, can lead to the emergency call being cut off if the transfer is not completed quickly.

OBJECT AND SUMMARY OF THE INVENTION

The invention serves in particular to remedy the above-mentioned drawbacks of the state of the art by proposing a processing method that is performed by an entry server of an IMS core network to process emergency call session transfer requests, said method being characterized in that it comprises:

a prior configuration step at the entry server for configuring a table associating at least one emergency call session transfer number with a plurality of emergency call session transfer nodes, each node being identified in said table by an address;

a determination step, triggered on receiving a request to transfer an emergency call session from a first access network to a second access network, the transfer request including an emergency call session transfer number, said step comprising using the table previously configured in the entry server to determine at least one address of a transfer node associated with the transfer number contained in the request to transfer the request; and a sending step for sending the transfer request to said at least one address as determined in this way.

Correspondingly, the invention also provides an entry server of an IMS core network, the server comprising:

a table configured beforehand and locally in the entry server, the table associating at least one emergency call session transfer number with a plurality of emergency call session transfer nodes, each node being identified in the table by an address;

a receive module suitable for receiving a request to transfer an emergency call session from a first access network to a second access network, the transfer request including an emergency call session transfer number;

a determination module activated by the receive module on receiving the transfer request, the determination module being configured to determine, from the previously configured table in the entry server, at least one address of a transfer node associated with the transfer number contained in the request to transfer the request; and a send module for sending the transfer request to said at least one address determined by the determination module.

The entry server of the invention is typically an I-CSCF server of the IMS core network, and the emergency call session transfer nodes are EATF instances as described above. The term "instance" is used in the conventional meaning of the term to designate a replica of a function (specifically in this example of the EATF function), different instances possibly being deployed on distinct physical devices (e.g. in order to benefit from geographical redundancy for the function), or on a single physical device.

The invention thus proposes defining a novel procedure enabling an I-CSCF server to address a plurality of EATF instances (i.e. nodes) deployed in an IMS core network for processing emergency call transfer requests. The procedure relies on previously storing a new predefined table locally in the I-CSCF server of the IMS core network, which table identifies, for at least one emergency call session transfer number, a plurality of EATFs by means of their respective addresses (e.g. Internet protocol (IP) addresses). The term "table" is used herein to designate any type of multidimensional structure enabling data to be stored.

When the IMS core network has a plurality of distinct I-CSCF servers, the table proposed by the invention is stored locally in each of those servers.

This table locally configured in each I-CSCF server advantageously contains all of the addresses of EATF instances deployed in the IMS core network in association with the E-STN-SR number(s) supported by the IMS core network in the event of the IMS core network being shared between a plurality of countries or regions (e.g. a distinct E-STN-SR number for each public land mobile network (PLMN)). Thus, in accordance with the invention, and by means of this table, when an emergency call transfer request reaches the I-CSCF server, it can identify directly the EATF instance(s) that might be concerned by this transfer request, to which it may transfer the request.

Specifically, unlike the state of the art (Document WO 2013/075746 and 3GPP standard), since the table is pre-established and configured locally in each I-CSCF server, it is not necessary for the I-CSCF server that receives the transfer request from the MSC device of the second access network to consult the HSS in order to obtain the address of an EATF instance that corresponds to the E-STN-SR number to which the transfer request is to be transferred. This leads to savings in terms of loading and traffic on the Diameter Cx interface with the HSS, thereby reducing the time required for processing the transfer request by the I-CSCF server, and also to continuity in processing emergency calls, even in the event of the HSS not being available.

The invention is also advantageously implemented in the I-CSCF server, i.e. in the entry server to the IMS core network for the world outside the IMS core network (typically for MSC devices and for other operators). Consequently, the invention requires only minor modification to the I-CSCF server as is already provided for in the 3GPP standard. It therefore makes it easy to deploy multiple EATF instances in the IMS core network, e.g. at a plurality of geographical sites, and to ensure that the EATF function properly speaking continues to remain available, even in the event of losing one of the deployed EATF instances or in the event of one of them becoming inaccessible.

In a particular implementation, the table configured in the entry server includes, for the transfer number included in the received request, a plurality of addresses of transfer nodes, and during the sending step, the transfer request is sent simultaneously to that plurality of addresses.

Correspondingly, in this implementation, the table configured in the entry server includes, for the transfer number included in the received request, a plurality of addresses of transfer nodes, and the send module is configured to send the transfer request simultaneously to said plurality of addresses.

In other words, in this implementation, the I-CSCF server transmits the emergency call session transfer request in parallel to all of the processing nodes associated in the table with the transfer number that is included in the request. In contrast, only the processing node that has anchored the emergency signaling is in a position to respond positively (i.e. to process) this call transfer request. Nevertheless, this parallel sending to all of the processing nodes identified in the table in association with the transfer number included in the request ensures that the transfer request is transmitted without delay to the node that has anchored the signaling of the emergency call.

In addition, this implementation makes it easy to manage deploying the EATF function on redundant geographical sites in order to ensure that it is always possible to transfer emergency calls.

In another implementation, each transfer node is associated with a priority in the table configured in the entry server, and during the sending step, the transfer request is sent simultaneously to the address(es) of the node(s) that is/are associated with the highest priority in the table.

This implementation makes it possible to give priorities to the various processing nodes, which priorities are representative of their capabilities for processing the transfer request at a given instant. This implementation has a preferred application in a context of network reorganization (e.g. in order to increase capacity, to apply maintenance to one or more EATF instances, and at a given instant to define backup instances, etc.).

In a particular implementation, the processing method includes a step of updating the previously configured table in the entry server for at least one emergency transfer session number.

Specifically, this updating may involve updating the priorities associated with each of the processing nodes as a function of variations in the configuration of the core network (nominal processing node and redundancy backup nodes) or in the states of the processing nodes, etc.

Thus, by way of example, after detecting a non-operational state for a transfer node associated with the highest priority to which the entry server has sent the transfer request, the processing method may include a step of updating the table, during which the transfer node is associated with a priority lower than the highest priority in the table.

A non-operational state of the transfer node may be detected in various ways.

Thus, by way of example, such a state may be detected if, on expiry of a timer triggered for a predetermined length of time starting from the entry server sending the transfer request to a determined transfer node, the entry server has not received any (positive or negative) response from the transfer node.

In a variant, a network or transport level error condition may be detected by the entry server, e.g. the entry server may receive a transmission control protocol (TCP) reset (RST) message, or it may receive an Internet control message protocol (ICMP) "destination unreachable" message.

In yet another variant, the entry server may receive a predetermined negative response from the transfer node (specific to the invention) indicating a state of the transfer node, e.g. such as a response indicating "transfer node overloaded" or "transfer node in maintenance", and such that the entry server associates the transfer node in question with a non-operational state.

The updating step may also include changing the priority of a transfer node that is associated in the table with a priority lower than the highest priority, so as to associate it with said highest priority.

Such updating serves to optimize the time for transferring an emergency call session. Specifically, even though such updating does not prevent the emergency call that is being processed from being lost, it advantageously makes it possible to process subsequent transfer requests effectively and correctly.

In a particular implementation, the various steps of the processing method are determined by computer program instructions.

Consequently, the invention also provides a computer program on a data medium, the program being suitable for being implemented in an entry server of an IMS core network, or more generally in a computer, the program including instructions adapted to performing steps of a processing method as described above.

The program may use any programming language, and be in the form of source code, object code, or code intermediate between source code and object code, such as in a partially compiled form, or in any other desirable form.

The invention also provides a computer readable data medium, including instructions of a computer program as mentioned above.

The data medium may be an entity or device capable of storing the program. By way of example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides an IMS core network having a plurality of emergency call session processing nodes associated with at least one emergency call transfer number, and an entry server to the IMS core network of the invention.

In other implementations, it is also possible to envisage that the processing method, the entry server of the IMS core network, and the IMS core network of the invention present in combination all or some of the above-specified characteristics.

BRIEF DESCRIPTION OF THE DRAWINGS

Other characteristics and advantages of the present invention appear from the following description given with reference to the accompanying drawings, which show an implementation having no limiting character. In the figures.

DETAILED DESCRIPTION OF THE INVENTION

Figure 1:
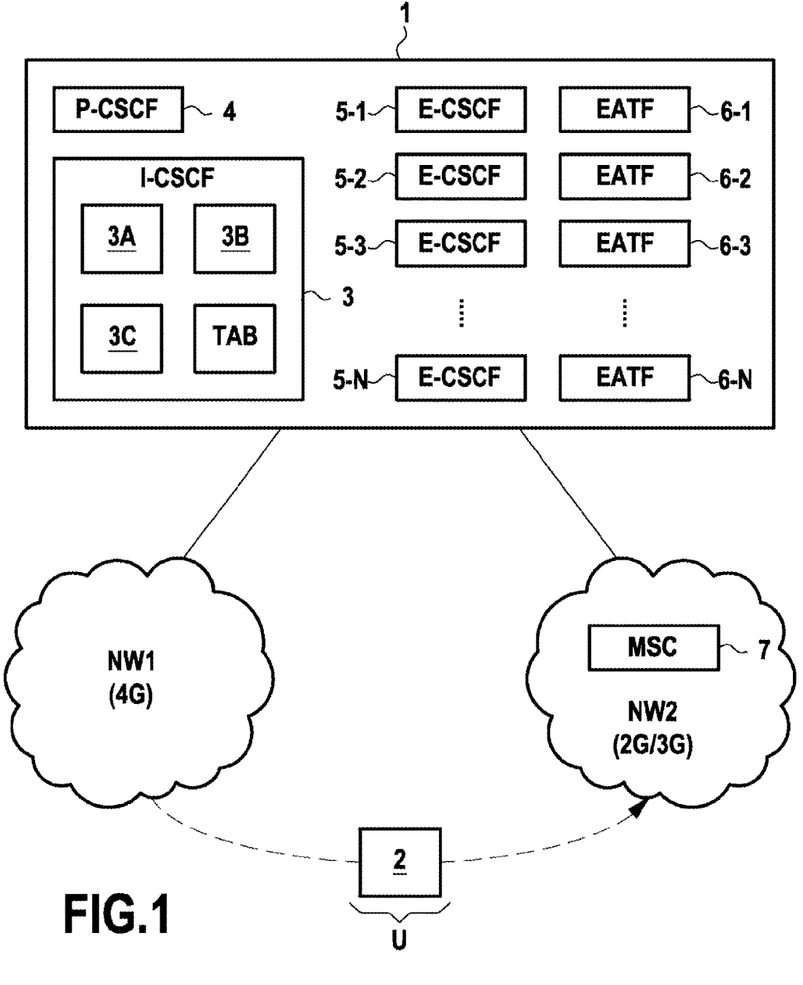
FIG. 1 is a diagram showing an IMS core network in accordance with the invention in a particular embodiment.

FIG. 1 shows, in its environment, a voice-over-IP core network 1 that relies on an IMS architecture and that is in accordance with the invention, in a particular embodiment.

In known manner, the IMS architecture is a standardized architecture, defined by the 3GPP standard, and it makes it possible to supply users having appropriate terminals with fixed and mobile multimedia services. Among other things, it makes it possible to use voice-over-IP technology and for this purpose it relies on the session initiation protocol (SIP).

In the example shown in FIG. 1, consideration is given to a terminal 2 of a user U that is suitable for accessing the services made available by the core network 1. No limitation is associated with the nature of the terminal 2. By way of example, it may be a smartphone, a digital tablet, or indeed a laptop computer, etc.

The terminal 2 is a terminal that is "multimode" in that it can access the services made available by the IMS core network 1 via different access networks, and in particular via a first access network NW1 and via a second access network NW2. In the presently-described example, the access network NW1 is an LTE 4G access network, and the access network NW2 is a 2G/3G access network. Nevertheless, in a variant, other access networks could be envisaged.

As mentioned above, the invention relates to processing emergency calls initiated in an IMS core network, and it relates more particularly to transferring such calls from one access network to the other. In the example shown in FIG. 1, consideration is thus given to an emergency call initiated by the terminal 2 in the IMS core network (i.e. in the packet switched (PS) domain) via the access network NW1, and then transferred to the circuit switched (CS) domain, the terminal 2 being constrained to hand over to the access network NW2, e.g. as a result of the terminal 2 losing coverage from the network NW1.

In FIG. 1, only those entities of the IMS core network 1 that are involved in processing emergency calls are shown, for reasons of simplification. In this example, these entities comprise in particular an I-CSCF server 3 in accordance with the invention, a proxy-CSCF (P-CSCF) server 4, and a plurality of emergency call processing servers E-CSCF 5-1, . . . , 5-N, which are associated with a plurality of EATF emergency call transfer nodes 6-1, . . . , 6-N, where N is an integer greater than 1. These various entities, except where specified explicitly in the description, implement the functions of corresponding entities as defined in the 3GPP standard. In particular, the I-CSCF server 3 constitutes the entry point (server) to the IMS core network for entities that are external to the IMS core network, and in particular for the MSC device 7 that manages calls in the access network NW2. Such a device is itself known and is not described in greater detail herein.

In a variant, the IMS core network 1 may have a plurality of I-CSCF servers and/or a plurality of P-CSCF servers, in particular in order to provide redundancy for the function(s) provided by those servers.

It should also be observed that the various above-mentioned entities (P-CSCF, I-CSCF, E-CSCF, E-ATCF, etc.) may be hosted in a single physical device or in distinct physical devices.

Figure 2:
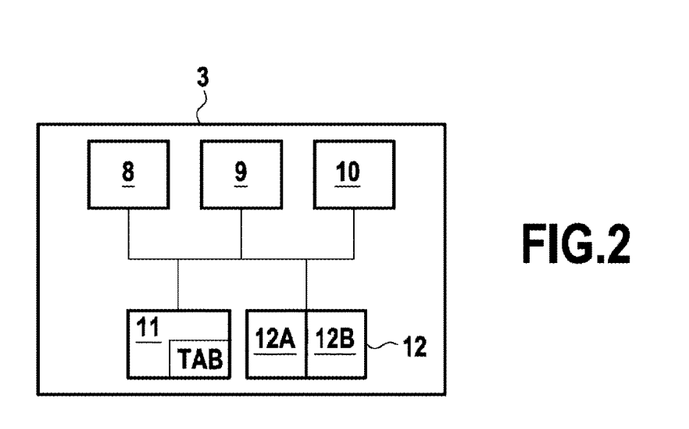
FIG. 2 shows the hardware architecture of an IMS core network entry server in accordance with the invention, in a particular embodiment.

In the presently-described embodiment, the I-CSCF server 3 has the hardware architecture of a computer. As shown in FIG. 2, it thus comprises in particular a processor 8, a read only memory (ROM) 9, a random access memory (RAM) 10, a non-volatile memory 11, and a communication module 12 comprising in particular a first communication module 12A for the access network NW1 and a second communication module 12B for the access network NW2, both of which are themselves known. The ROM 9 of the I-CSCF server 3 constitutes a data medium in accordance with the invention that is readable by the processor 8 and that stores a computer program in accordance with the invention including instructions for executing steps of the processing method of the invention.

In other words, the I-CSCF server 3 differs from an I-CSCF server as defined by the 3GPP standard in that it is configured to perform a processing method of the invention. To this end, and as mentioned above, the I-CSCF server 3 is configured by the operator of the IMS core network 1 with a pre-established table TAB that is stored in its non-volatile memory 11. The term "table" is used herein to mean a multidimensional data structure suitable for storing data.

The table TAB, which is configured locally in the I-CSCF server 3, associates at least one emergency call session transfer number of the E-STN-SR type with a plurality of EATF nodes from among the above-mentioned nodes 6-1, . . . , 6-N, each node being identified in the table TAB by its reachability or contact address. By way of example, in this example this address may be an IP address. In a variant, it may be a domain name that can be resolved by conventional domain name server (DNS) procedures that are themselves known.

In the presently-described example, each transfer node identified in the table TAB is also associated with a priority, which in this example is representative of its probability of processing transfer requests. These priorities are set up by the operator as a function of various criteria. For example, an EATF node that is to be selected nominally to anchor the signaling of emergency calls (referred to below as the "nominal node") may be associated with a priority P1 that is greater than the priority P2 associated with a backup EATF node that is designed to be used in the event of the nominal node failing. The operator may also decide to associate the same priority P1 with all of the EATF nodes available to the operator for a given geographical zone.

Figure 3:
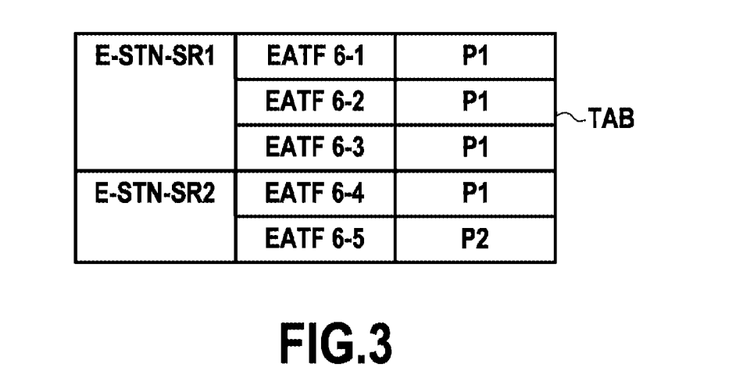
FIG. 3 shows an example of a table locally configured at the FIG. 1 IMS core network entry server.

FIG. 3 shows an example of the table TAB with which the I-CSCF server 3 is configured. In this example, two transfer numbers E-STN-SR1 and E-STN-SR2 are considered for the IMS core network 1. By way of example, these numbers are associated with different geographical zones (e.g. different countries).

The transfer number E-STN-SR1 is associated with three EATF nodes 6-1, 6-2, and 6-3. Each EATF node is associated with the same priority P1.

The transfer number E-STN-SR2 is associated with two EATF nodes 6-4 and 6-5, which are themselves associated with different priorities: in particular, the EATF node 6-4 is associated with a priority P1 and the EATF node 6-5 with a priority P2, where P1 is greater than P2. By way of example, such circumstances may exist when the EATF node 6-5 is a backup EATF node that is to be used in the event of failure of the nominal EATF node 6-4. The priorities P1 and P2 in this example are representative of a "nominal" mode of operation and of a "backup" mode of operation for the EATF transfer nodes.

Naturally, this example is given purely by way of illustration, and some other number of E-STN-SR numbers could be envisaged (e.g. a single number), and likewise some other number of EATF nodes associated with each E-STN-SR number, and a different configuration of the priorities associated with those EATF nodes by the operator of the IMS core network.

In this example, the above-mentioned computer program stored in the ROM 9 of the I-CSCF server 3 defines functional and software modules of the I-CSCF server 3 that are suitable for performing the steps of the processing method of the invention. In particular, these functional modules comprise a receive module 3A for receiving emergency call session transfer requests, a determination module 3B for determining EATF nodes for processing these requests, the module 3B being suitable for interrogating the table TAB, and a send module 3C for sending received transfer requests to the EATF nodes identified by the determination module. These modules rely in particular on and/or control the physical and hardware elements 8-12 of the I-CSCF server 3 as described above with reference to FIG. 2. In particular, the receive module 3A and the send module 3C rely on or control the hardware communication module 12 of the I-CSCF server 3, and more particularly the hardware communication modules 12A and 12B. The functions of the modules 3A, 3B, and 3C are described below with greater detail with reference to the corresponding steps of the processing method of the invention.

Figure 4:
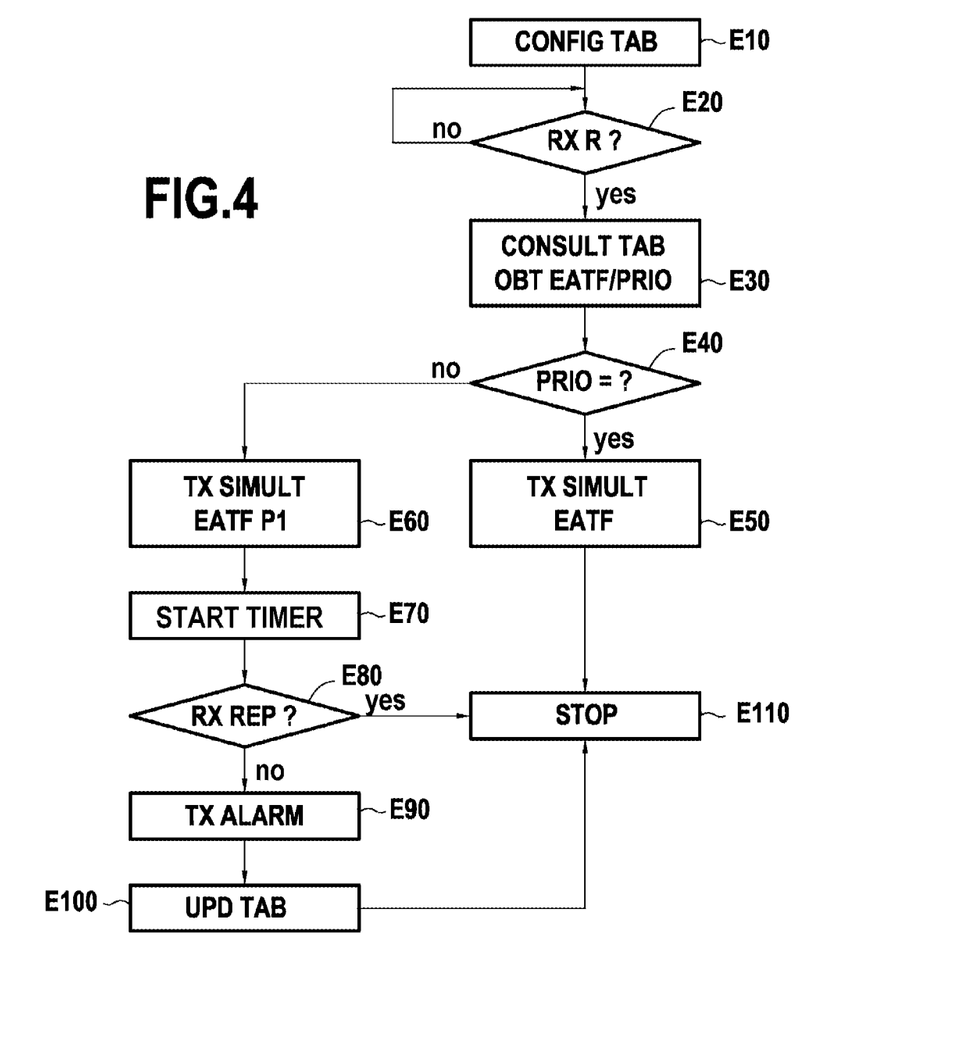
FIG. 4 is a flow chart showing the main steps of a processing method of the invention as implemented by the FIG. 1 IMS core network entry server.

With reference to FIG. 4, there follows a description of the main steps of the processing method of the invention, in a particular implementation, and as performed by the I-CSCF server 3 using the table TAB shown in FIG. 3.

In accordance with the invention, it is assumed that the I-CSCF server 3 has previously been configured with the table TAB (step E10). It should be observed that when the IMS core network has a plurality of I-CSCF servers 3, e.g. to provide redundancy for the functions provided by the I-CSCF, each of the servers in question is previously configured with the table TAB, i.e., prior to any processing of call session transfer requests, it has the table TAB stored in its non-volatile memory, for example.

It is assumed that the user U uses the terminal 2 in compliance with the present state of the art to set up an emergency call via the access network NW1. The emergency call transits via the P-CSCF server 4, the entry point for user requests into the IMS core network 1, and it is processed in compliance with the 3GPP standard by the E-CSCF node 5-2, for example. In particular, it is assumed that the E-CSCF node 5-2 anchors the emergency call signaling issued by the terminal 2 in the EATF node 6-2. It should be observed that the P-CSCF server 4 selects a single E-CSCF node, namely the node 5-2, from among the various E-CSCF nodes deployed in the IMS core network 1 for processing the incoming emergency call.

The processing of emergency calls as defined in the 3GPP standard is described in particular in the above-mentioned 3GPP documents TS 24.229 and TS 24.237, and is not repeated in detail herein.

It is now assumed that the terminal 2 loses its LTE coverage on the network NW1. The mobility management entity (MME) of the IMS core network 1 (not shown in FIG. 1) then initiates procedures for transferring access between the LTE access network NW1 and the 2G/3G access network NW2 to which the terminal 2 of the user U is switched (handed) over. In accordance with the procedures defined in the 3GPP standard TS 24.237 in such a situation, the MSC device 7 in charge of processing calls in the access network NW2 then issues a transfer request R to the I-CSCF server 3 of the IMS core network 1.

It is assumed that the MSC device 7 is configured in this example to process the transfer of emergency calls initiated in the core network 1 with the transfer number E-STN-SR1. The transfer request R is thus in the form of an SIP INVITE request sent to the transfer number E-STN-SR1. In other words, in compliance with the SIP protocol, the transfer number E-STN-SR1 is contained in the "Request-URI" field of the request.

On receiving the request R (response "yes" to test step E20 consisting in detecting reception of an emergency call transfer request) via the network NW2, and by means of its receive module 3A, the I-CSCF server 3 determines that the request is being sent to the transfer number E-STN-SR1, and it uses its determination module 3B to consult the table TAB on the basis of that number in order to determine the EATF transfer nodes associated with the number E-STN-SR1 (step E30).

In the example shown in FIG. 3, the module 3B of the I-CSCF server 3 determines that three EATF nodes, namely the nodes 6-1, 6-2, and 6-3 are associated with the emergency call session transfer number E-STN-SR1. These nodes are associated in the table TAB with the same relative priority P1.

In the presently-described implementation, when all of the EATF nodes associated with the transfer number contained in the transfer request as received by the I-CSCF server 3 have the same priority (response "yes" to test step E40 consisting in determining whether the nodes identified in the table in step E30 are associated with priorities that are or are not identical), the I-CSCF server 3 sends the transfer request R simultaneously to all of these nodes (i.e. to the EATF nodes 6-1, 6-2, and 6-3 in this example), using the addresses specified for these nodes in the table TAB and by using its send module 3C (step E50).

Since the EATF nodes 6-1 and 6-3 are not initially involved in processing the emergency call issued by the terminal 2 (the signaling for this call being anchored in the EATF node 6-2), these nodes respond to the transfer request received from the I-CSCF server 3 with an SIP 404 message, in conventional manner.

However, the EATF node 6-2 has anchored this signaling of the emergency call as it was being set up by the terminal 2. It is thus well placed to give a positive response and process the transfer request received from the I-CSCF server 3, and in particular to forward this request R to the E-CSCF server 5-2, which in turn relays the request to its public station answering point (PSAP) type emergency call center, known per se, in compliance with the procedures presently defined in the 3GPP standard and described in the above-mentioned 3GPP document TS 24.237. This terminates the processing method of the invention (step E110).

In a variant, it is possible to envisage another use for the invention in which the server/node pairs 5-1/6-1, 5-2/6-2, and 5-3/6-3 are mutually redundant pairs, that can be used in the event of any one of these pairs failing or being inaccessible, e.g. because the site hosting it has failed or is inaccessible. Thus, by way of example, it is assumed that the site hosting the E-CSCF server 5-1 (and the associated EATF node 6-1) has failed so that on receiving the emergency call issued by the terminal 2, the P-CSCF server 4 transmits this call to the E-CSCF server 5-2, which anchors the associated signaling in the EATF node 6-2.

Under such circumstances, after the transfer request R has been sent to the three EATF nodes 6-1, 6-2, and 6-3, while the site hosting the EATF node 6-1 is inaccessible, no response is received by the I-CSCF server 3 from the EATF node 6-1, whereas it receives a positive response from the EATF node 6-2 anchoring the signaling for the call that is to be transferred.

The invention thus makes it possible to deploy the EATF function over redundant geographical sites in order to ensure that emergency calls can always be transferred.

There follows an illustration of another example of the behavior of the I-CSCF server 3 when the EATF transfer nodes associated with the E-STN-SR number contained in the transfer request do not all have the same priority in the table TAB. Having recourse to different priorities in the table TAB serves to facilitate deploying EATF emergency nodes in order to mitigate inaccessibility of a nominal EATF node, e.g. as a result of a malfunction or a failure of the nominal node. Specifically, by giving different priorities to the nominal node and to the backup nodes in the table, it is possible, in the event of the nominal node not being available to process the current transfer request, to identify quickly a backup node for taking over at network level in order to manage subsequent transfer requests, as explained below.

In this other example, it is now assumed that the emergency call issued by the terminal 2 via the access network NW1 is conveyed by the P-CSCF server 4 to the E-CSCF server 5-4. The call signaling is anchored by the E-CSCF server 5-4 in the EATF node 6-4.

When the terminal 2 loses its LTE coverage on the network NW1, as mentioned above, the MME entity of the IMS core network 1 initiates access transfer procedures between the LTE access network NW1 and the 2G/3G access network NW2, and the MSC device 7 then issues a transfer request R to the I-CSCF server 3 of the IMS core network 1. It is now assumed in this example that the MSC device 7 is configured with the transfer number E-STN-SR2. The transmit request R is thus in the form of an SIP INVITE request containing the transfer number E-STN-SR2 in its "Request-URI" field.

On receiving the request R via its receive module 3A, the I-CSCF server 3 determines that this request is being sent to the transfer number E-STN-SR2, and it consults its table TAB by using this number to determine the EATF transfer nodes that are associated with the number E-STN-SR2 (step E30).

In the example shown in FIG. 3, the module 3B of the I-CSCF server 3 determines that two EATF nodes, namely the nodes 6-4 and 6-5, are associated with the emergency call session transfer number E-STN-SR2, but with different priorities. The EATF node 6-4 is associated in the table TAB with the priority P1, while the EATF node 6-5 is associated with the priority P2 that is lower than the priority P1. In this example, this means that the nominal EATF node is the EATF node 6-4 and that the backup node is the EATF node 6-5.

In the presently-described implementation, when the EATF nodes associated with the transfer number included in the transfer request received by the I-CSCF server 3 have different priorities (response "no" to test step E40), the I-CSCF server 3 acts via its send module 3C to send the request to the EATF node(s) of highest priority (in this example P1), in other words corresponding to the nominal mode of operation of the IMS core network (step E60). In the example of FIG. 3, the transfer request is thus sent to the EATF node 6-4. If a plurality of nodes share the same priority, the transfer request is sent to all of those nodes simultaneously.

In the presently-described implementation, sending the transfer request to the EATF node 6-4 starts a timer for a predetermined time period T (step E70).

On expiry of the time period T, if no positive response, or more generally no response at all, is received from the EATF node 6-4 (where the signaling of the emergency call issued by the terminal 2 is anchored in the present example) (response "no" to test step E80), the backup mode of operation is triggered. Specifically, since the EATF node 6-4 that anchored the signaling for the emergency call issued by the terminal 2 is not responding, that means that this node is not accessible, e.g. because it has failed or because of maintenance, etc., and it is therefore not in a position to process the transfer of this call. The emergency call being processed is therefore lost.

In the presently-described implementation, the absence of a response from the EATF node 6-4 causes the send module 3C of the I-CSCF server 3 to send an alarm to the operator of the IMS core network 1 in order to indicate that the nominal EATF node 6-4 is unavailable (step E90).

Above-described steps E70 and E80 constitute a test step seeking to detect a non-operational state (e.g. an inaccessible state), if any, of the EATF transfer node 6-4 to which the transfer request was sent by the I-CSCF server 3 (or the transfer nodes to which the transfer request was sent).

Other ways of detecting a non-operational state of a transfer node to which the I-CSCF server 3 has sent the transfer request could nevertheless be envisaged as a variant or in addition to the alternative proposed in steps E70 and E80 in FIG. 4.

Thus, by way of example, a network or transfer level error condition may be detected by the I-CSCF server 3, for example the I-CSCF server 3 may detect whether it has received a transmission control protocol (TCP) reset (RST) message or an Internet control message protocol (ICMP) "destination unreachable" message.

In yet another variant, the I-CSCF server 3 may detect whether it has received a predetermined negative response from the transfer node (specific to the invention) indicating a state of the transfer node, such as for example a response indicating "transfer node overloaded" or "transfer node in maintenance", and that the entry server associates to a non-operational state of the transfer node in question.

After sending this alarm, and in order to mitigate the malfunction of the nominal EATF node 6-4, the table TAB is updated (step E100). This updating may be performed by the operator of the IMS core network 1, who is informed of the unavailability of the EATF node 6-4, or it may be performed directly by the I-CSCF server 3. More precisely, in the presently-described implementation, it consists in changing the priority associated with the nominal EATF node 6-4 from P1 (high priority) to P2 (low priority), and in changing the priority associated with the backup EATF node 6-5 from P2 (low priority) to P1 (high priority). In other words, the priorities of the EATF nodes 6-4 and 6-5 are interchanged for processing forthcoming transfer requests.

Furthermore, the EATF Node 6-4 is declared (temporarily or permanently) unavailable so as to be no longer selectable by an E-CSCF node for anchoring the signaling of an incoming emergency call.

More generally, if a plurality of EATF nodes are associated with a priority P1 in the table TAB and do not response to the transfer request R issued by the I-CSCF node 3 when the period T expires, the table TAB is updated by putting those nodes to low priority P2 while the EATF nodes that were initially associated with low priority P2 are changed to high priority P1.

By updating the table TAB in this way, it is ensured that the EATF node 6-5 takes over from the faulty EATF node 6-4 for subsequent transfer requests. The processing method of the invention comes to an end once this updating has been done (step E110).

It is also possible to imagine that other EATF nodes are associated with the transfer number E-STN-R2 with another priority P3 that is lower than P2. Steps E80 to E100 are then reiterated using the nodes associated with the priority P3, should that be necessary (in the event of no response from an EATF node associated with the priority P2).

It is also possible to imagine that in the event of detecting a non-operational state (and in particular a state of non-accessibility), concerning a transfer node to which the I-CSCF node 3 has transmitted the transfer request R, that node is then associated during the step E100 of updating the table TAB with the lowest priority used in the table in order to inform the I-CSCF server 3 that this node is out of service.

On the contrary, if the EATF node 6-4 is in an operational state, since this node was anchored to the signaling of the emergency call when it was set up by the terminal 2, it responds positively to the I-CSCF server 3 (response "yes" to test step E80), and the processing method of the invention terminates (step 110). The EATF node 6-4 processes the transfer request received from the I-CSCF server 3, and in particular causes this request R to be forwarded of the E-CSCF server 5-4, which in turn relays this request to the PSAP emergency call center, as mentioned above.

Thus, configuring the table TAB in this way with different priorities being associated with the EATF nodes constitutes a preferred but non-limiting application when reorganizing a network (e.g. increasing capacity, maintenance of an EATF node, etc.).

The invention claimed is:

1. A method of processing emergency call session transfer requests, the method performed by an entry server of an IP multimedia subsystem (IMS) core network and comprising:
configuring locally in the entry server a table associating at least one emergency call session transfer number with a plurality of emergency call session transfer nodes, each node identified in the table by an address;
upon receiving a request to transfer an emergency call session from a first access network to a second access network, the transfer request including an emergency call session transfer number, determining, using the configured table to determine at least one address of a transfer node associated with the transfer number contained in the request to transfer the request; and
sending the transfer request to the at least one determined address.

2. The processing method of claim 1, wherein the configured table includes, for the transfer number included in the received request, a plurality of addresses of transfer nodes, and wherein sending the transfer request to the at least one determined address comprises sending the transfer request simultaneously to the plurality of addresses of transfer nodes.

3. The processing method of claim 1, wherein each transfer node is associated with a priority in the configured table, and wherein sending the transfer request to the at least one determined address comprises sending the transfer request simultaneously to the address(es) of the node(s) that is/are associated with the highest priority in the table.

4. The processing method of claim 3, additionally comprising, upon detection of a non-operational state for a transfer node associated with the highest priority to which the entry server has sent the transfer request, updating the table, during which the transfer node is associated with a priority lower than the highest priority.

5. The processing method of claim 1, additionally comprising updating the previously configured table for at least one emergency transfer session number.

6. The processing method of claim 4, wherein updating the table further includes changing the priority of a transfer node that is associated in the table with a priority lower than the highest priority, so as to associate it with the highest priority.

7. A computer having stored thereon instructions, which when executed by the computer, cause the computer to perform the method of claim 1.

8. A non-transitory computer readable data medium having stored thereon instructions, which when executed by a processor, cause the processor to perform the method of claim 1.

9. An entry server of an IP multimedia subsystem (IMS) core network, the server comprising a table configured beforehand and locally in the entry server, the table associating at least one emergency call session transfer number with a plurality of emergency call session transfer nodes, each node being identified in the table by an address, the entry server configured to:
receive a request to transfer an emergency call session from a first access network to a second access network, the transfer request including an emergency call session transfer number;
upon receiving the transfer request, determine, from the configured table, at least one address of a transfer node associated with the transfer number contained in the request to transfer the request; and
send the transfer request to the at least one determined address.

10. The server of claim 9, wherein the configured table r includes, for the transfer number included in the received request, a plurality of addresses of transfer nodes, and wherein the server is configured to send the transfer request simultaneously to the plurality of addresses of transfer nodes.

11. An IMS core network comprising:
a plurality of emergency call session transfer nodes associated with at least one emergency call transfer number, and
the entry server of claim 9.

* * * * *